United States Patent
Haruta et al.

(10) Patent No.: US 6,525,686 B2
(45) Date of Patent: Feb. 25, 2003

(54) RECEIVING/TRANSMITTING APPARATUS AND RADAR EQUIPMENT

(75) Inventors: Tomohiro Haruta, Kawasaki (JP); Akito Miyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/997,184

(22) Filed: Nov. 29, 2001

(65) Prior Publication Data

US 2003/0011510 A1 Jan. 16, 2003

(30) Foreign Application Priority Data

Jul. 10, 2001 (JP) ........................ 2001-209141

(51) Int. Cl.[7] ............................................ G01S 13/524
(52) U.S. Cl. .................... 342/160; 342/194; 342/102
(58) Field of Search ................ 342/160, 161, 342/162, 89, 100, 102, 194, 195

(56) References Cited

U.S. PATENT DOCUMENTS

| 3,979,752 | A | * | 9/1976 | Charlot .......................... 342/92 |
| 4,709,407 | A | * | 11/1987 | Baba .......................... 455/226.1 |
| 5,276,450 | A | * | 1/1994 | Schwegman .................. 342/16 |
| 5,281,973 | A | * | 1/1994 | Murphy, Jr. et al. .......... 342/62 |

FOREIGN PATENT DOCUMENTS

JP 10-132926 5/1998

OTHER PUBLICATIONS

"A new millimeter–wave step–frequency radar sensor for distance measurement", Joongsuk Park; Cam Nguyen, Microwave and Wireless Components Letters, IEEE, vol. 12 Issue: 6, Jun. 2002, pp. 221–222.*

"Receiver operating characteristics for the coherent UWB random noise radar", Dawood, M.; Narayanan, R.M., Aerospace and Electronic Systems, IEEE Transactions on , vol. 37 Issue: 2 , Apr. 2001, pp. 586–594.*

"A novel W–band fully coherent solid–state radar transceiver", Jian Huang; Tiguo Gan; Yongquan Zou Radar, 2001 CIE International Conference on, Proceedings , 2001, pp. 907–911.*

"An FM–CW radar module with front–end switching heterodyne receiver", Saito, T.; Okubo, N.; Kawasaki, Y.; Isaji, O.; Suzuki, H Microwave Symposium Digest, 1992., IEEE MTT–S International , 1992, pp. 713–716 vol. 2.*

* cited by examiner

Primary Examiner—John B. Sotomayor
(74) Attorney, Agent, or Firm—Katten Muchin Zavis Rosenman

(57) ABSTRACT

The present invention relates to a receiving/transmitting apparatus for radiating a predetermined signal and receiving a signal arriving as a response to the radiated signal, and to a radar equipment in which the receiving/transmitting apparatus is installed. In the receiving/transmitting apparatus and the radar equipment according to the present invention, high coherency is reliably achieved without any great enlargement in hardware scale. Therefore, it is possible to realize with high reliability improvement in performance and reliability as well as price reduction, downsizing, and running cost reduction in apparatuses and systems to which the present invention is applied.

22 Claims, 10 Drawing Sheets

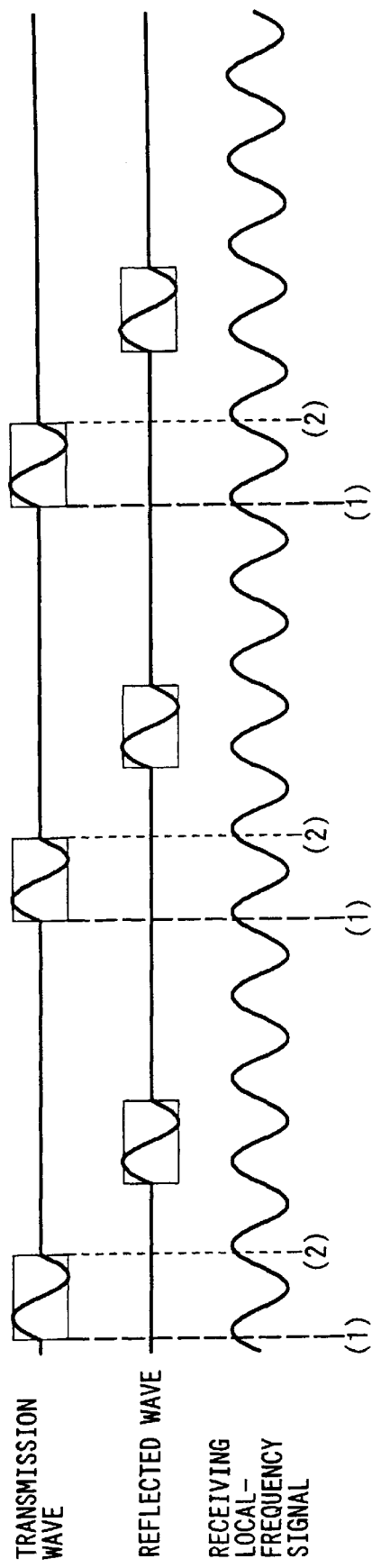
F I G. 5 a
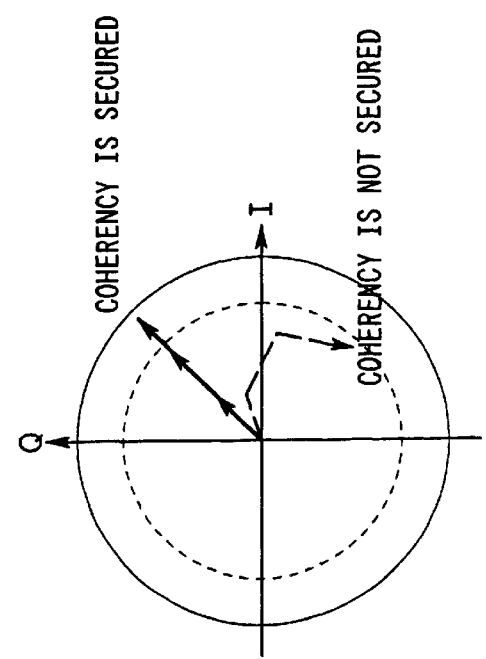
F I G. 5 b

RECEIVING/TRANSMITTING APPARATUS AND RADAR EQUIPMENT

BACKGROUND OF THE INVENTION

1. Field of the Invention

The present invention relates to a receiving/transmitting apparatus for radiating a predetermined signal and receiving a signal arriving as a response to the radiated signal and a radar equipment in which the receiving/transmitting apparatus is installed.

2. Description of the Related Art

In recent years, a technique for realizing sophisticated signal processing at a high speed and at a low price has been established and such signal processing has been widely applied to various electronic apparatuses and systems.

This signal processing technique has been increasingly applied to, for example, radio application equipments and navigation aids such as radar equipments, among the above-mentioned electronic apparatuses, as an indispensable element technique for achieving high performance and reliability under desirable environment conditions or for heightening added values as well as for realizing adaptability to severe demands for price reduction, downsizing, lightening, energy saving, and others.

FIG. 8 is a diagram showing a first structure example of a receiving/transmitting part of a radar equipment to which the signal processing technique is applied.

In FIG. 8, one output of a COHO oscillator 51 is connected to an input of a mixer 52, and to a local-frequency input of the mixer 52, one output of an STALO oscillator 53 is connected. An output of the mixer 52 is connected to a first aperture of a circulator 56 via a pulse modulator (SW) 54 and a power amplifier 55 which are connected in cascade. To a second aperture of the circulator 56, a feeding point of an antenna 57 is connected, and a third aperture of the circulator 56 is connected to an input of the mixer 58. To a local-frequency input of the mixer 58, the other output of the STALO oscillator 53 is connected. An output of the mixer 58 is connected to an input of a quadrature demodulator 59. To a carrier input of the quadrature demodulator 59, the other output of the COHO oscillator 51 is connected and an output of the quadrature demodulator 59 is connected to an input of a not-shown signal processing part.

In the radar equipment as structured above (hereinafter referred to as a 'first conventional example'), the COHO oscillator 51 constantly generates a reference signal with a predetermined frequency fc. The STALO oscillator 53 also generates a local-frequency signal with a predetermined frequency fs constantly.

The mixer 52 generates a transmitting signal with a frequency ft (=fc+fs) equal to the sum of the frequencies of the reference signal and the local-frequency signal. The pulse modulator 54 performs on-off keying of the transmitting signal at a predetermined duty factor to generate a transmission wave and radiates the transmission wave via the power amplifier 55, the circulator 56, and the antenna 57.

A reflected wave reaching the antenna 57 from a target in response to the transmission wave is fed to the mixer 58 via the circulator 56.

The mixer 58 converts the reflected wave to an intermediate frequency signal with a frequency equal to a difference fr (=ft−fs=fc) between a frequency of the reflected wave and the frequency of the local-frequency signal which is generated by the STALO oscillator 53.

The quadrature demodulator 59 quadrature-demodulates the intermediate frequency signal according to the reference signal which is given by the COHO oscillator 51 to generate demodulation signals I, Q which are in quadrature.

The aforesaid signal processing part performs predetermined signal processing for the demodulation signals I, Q to realize, for example, improvement in SN ratio, MTI, and others.

Incidentally, in the process of the signal processing, as long as the COHO oscillator 51 and the STALO oscillator 53 constantly generate the aforesaid reference signal and the local-frequency signal respectively with desirable precision, phases of components of the reflected wave, which arrives from the target located in a fixed relative distance, relative to a phase of the reference signal do not vary (hereinafter, to satisfy this condition is simply referred to as 'coherency'), and therefore, the improvement in the SN ratio and so on based on integrating processing and the like is achieved with high reliability.

FIG. 9 is a diagram showing a second structure example of a receiving/transmitting part of a radar equipment to which the signal processing technique is applied.

The radar equipment shown in FIG. 9 is characterized in that:
  a variable frequency oscillator 61 is provided to substitute for the COHO oscillator 51;
  a coupler 62 is provided to substitute for the mixer 52;
  neither the pulse modulator 54 nor the STALO oscillator 53 is provided; and
  the power amplifier 55 has a control terminal to which a later-described control signal is given together with a control input of the variable frequency oscillator 61.

Note that the same numerals and symbols are used to designate elements having the same functions as those of the elements shown in FIG. 8 and explanations thereof are omitted here.

In the radar equipment as structured above (hereinafter referred to as a 'second conventional example'), the variable frequency oscillator 61 alternately generates two signals having the same frequencies as those of the aforesaid transmitting signal and the local-frequency signal respectively (hereinafter referred to as a 'transmission wave signal' and a 'receiving local-frequency signal' respectively) according to logical values of a binary control signal which gives the aforesaid duty factor.

Note that periods during which the transmission wave signal and the receiving local-frequency signal are generated by the variable frequency oscillator 61 are hereinafter referred to as 'transmitting time' and 'receiving time' respectively for simplification.

The coupler 62 processes the following based on a difference between the frequency of the transmission wave signal and the frequency of the receiving local-frequency signal which are thus generated by the variable frequency oscillator 61.
  to send the transmission wave signal to the power amplifier 55 but prevent its feeding to the mixer 58
  to send the receiving local-frequency signal to the mixer 58 but prevent its feeding to the power amplifier 55

The power amplifier 55 amplifies the transmission wave signal to be fed via the coupler 62 within the transmitting time which is given as the logical value of the aforesaid control signal and radiates the transmission wave signal as a transmission wave via the circulator 56 and the antenna 57.

The mixer 58 generates an intermediate frequency signal with a frequency equal to a difference between the frequency of the reflected wave, which reaches the antenna 57 during the above receiving time and is fed thereto via the circulator 56, and the frequency of the receiving local-frequency signal, which is fed thereto via the coupler 62 during the receiving time, and feeds the intermediate frequency signal to the quadrature demodulator 59.

In other words, the variable frequency oscillator 61 is commonly used for generating the receiving local-frequency signal during the receiving time and generating the transmission wave signal during the transmitting time while securing isolation between a transmitting part and a receiving part.

Therefore, in the second conventional example, where neither the pulse modulator 54 nor the STALO oscillator 53 shown in FIG. 8 is provided, the hardware structure is simplified compared with that in the first conventional example.

Incidentally, the same processing as in the first conventional example is performed by the quadrature demodulator 59 and the signal processing part which is provided on a subsequent stage of the quadrature demodulator 59 and therefore, explanations thereof are omitted here.

Note that the reference signal and the local-frequency signal are constantly generated in the above-described first conventional example.

Consequently, though the aforesaid coherence is secured, it is necessary to provide some hardware such as electromagnetic shielding and others for preventing cross-talk of the reference signal (given to the mixer 52 also during the period in which the reflected wave is to be received), the transmission wave signal, and the transmission wave to the mixer 58 and its subsequent stages from the mixer 52 via the pulse modulator 54 and the power amplifier 55, in order to avoid mis-detection which may possibly be caused particularly because the transmission wave and the reflected wave have the same frequency.

Therefore, the first conventional example requires an enlarged hardware scale and does not satisfy restrictions on cost, mountability, and others.

Meanwhile, in the second conventional example, since the frequencies of the aforesaid receiving local-frequency signal and the transmission wave signal are set at different values from each other, no electromagnetic shielding mentioned above is required but the variable frequency oscillator 61 oscillates the receiving local-frequency signal and the transmission wave signal alternately during the transmitting time and the receiving time.

Consequently, in the second conventional example, a phase difference between the transmission wave signal and the receiving local-frequency signal fluctuates in every new transmitting time and receiving time, as shown in FIG. 10(a) so that the coherency is not secured and the components of the reflected wave are integrated by the signal processing part, for example, as shown in FIG. 10(b).

As a result, the possibility that precision in the signal processing is degraded and desirable improvement in the SN ratio and desirable performance are not achieved in the signal processing process is high compared with the first conventional example.

SUMMARY OF THE INVENTION

It is an object of the present invention to provide a receiving/transmitting apparatus and a radar equipment in which coherency is achieved with high reliability, without causing any great enlargement in hardware scale.

It is another object of the present invention to separate the components of a reception wave at its every phase and to improve precision in signal processing which is performed for the components, without causing any great enlargement in hardware scale.

It is still another object of the present invention to simplify hardware structure.

It is yet another object of the present invention to stably achieve a desirable function and performance.

It is yet another object of the present invention to efficiently and highly reliably measure all or a part of the characteristic, shape, size, and material of a medium through which an emission wave a nd a reception wave propagate, even when the reception wave is very weak.

It is yet another object of the present invention to realize flexible adaptability of the structure t o the frequencies of an emission wave a nd a reception wave.

It is yet another object of the present invention to stably realize highly precise signal processing without any means for setting loose coupling or shielding coupling with means for generating a local-frequency signal which is used for receiving a reception wave.

It is yet another object of the present invention to stably achieve highly precise signal processing.

It is yet another object of the present invention to realize structure simplification as well as price reduction.

It is yet another object of the present invention to detect a reception wave efficiently and highly reliably even when the reception wave is very weak, as long as the characteristic of a propagation path of an emission wave and a reception wave, a time required for a target to respond, and the characteristic of the target do not vary.

It is yet another object of the present invention to measure all or a part of the characteristic of a medium interposed between the radar equipment and its target, a relative distance and a relative position to the target, and a relative speed and a size of the target, even when the reception wave is very weak.

It is yet another object of the present invention to highly maintain reliability and precision in identifying a target.

It is yet another object of the present invention to realize with high reliability improvement in performance and reliability as well as price reduction, downsizing, and running cost reduction in apparatuses and systems to which the present invention is applied.

The above objects are achieved by a receiving/transmitting apparatus which alternately generates the first signal and the second signal whose frequencies are different from each other and whose phases have different fixed initial values from each other, radiates an emission wave generated based on the first signal, and heterodyne-detects, according to the second signal, a reception wave received as a response to the emission wave to separate components of the reception wave at its every phase relative to the first signal or the second signal.

In the receiving/transmitting apparatus ascribed above, an initial value of a phase of the radiated emission wave is maintained at a fixed value every time the emission wave is transmitted, even though a signal generating section is used for both the generation of the emission wave and the heterodyne detection of the aforesaid reception wave.

The above objects are also achieved by a receiving/transmitting apparatus which radiates the first signal as an emission wave.

In the receiving/transmitting apparatus as described above, an initial value of a phase of the radiated emission wave is maintained at a fixed value every time the emission wave is transmitted, even though a signal generating section is used for both the generation of the emission wave and the heterodyne detection of the aforesaid reception wave.

The above objects are also achieved by a receiving/transmitting apparatus which alternately performs frequency synthesis according to two different synthetic ratios, in response to a reference signal with a fixed frequency, to generate the first signal and the second signal.

In the receiving/transmitting apparatus as described above, the first signal used for generating an emission wave or corresponding to the emission wave and the second signal used for receiving a reception wave are generated by performing the frequency synthesis according to the different synthetic ratios on the reference signals having a common frequency.

The above objects are also achieved by a receiving/transmitting apparatus which alternately performs frequency synthesis according to a fixed synthetic ratio, in response to two reference signals with different frequencies, to generate the first signal and the second signal.

In the receiving/transmitting apparatus as described above, switching frequencies of the first signal used for generating an emission wave or corresponding to the emission wave and the second signal used for receiving a reception wave is realized as updating an oscillating frequency of means for generating the reference signals.

The above objects are also achieved by a receiving/transmitting apparatus which alternately performs frequency synthesis according to two different synthetic ratios, in response to two reference signals with different frequencies, to generate the first signal and the second signal.

In the receiving/transmitting apparatus as described above, the frequency of the first signal used for generating an emission wave or corresponding to the emission wave and the frequency of the second signal used for receiving a reception wave are determined according to the combination of an oscillating frequency of means for generating the two reference signals, and the aforesaid synthetic ratios.

The above objects are also achieved by a receiving/transmitting apparatus which generates the first signal and the second signal by reading a sequence of instantaneous values of signals individually corresponding to the first signal and the second signal, during periods in which the first signal and the second signal are to be generated respectively. The sequence of the instantaneous values is stored in the storage areas of the storage section corresponding to the respective periods.

In the receiving/transmitting apparatus as described above, the first signal and the second signal are generated as the sequence of the instantaneous values which are stored in the storage section in advance and read so that the first and second signals are constantly obtainable compared with a case where the first and second signals are generated by an oscillating circuit which intermittently oscillates the first signal and/or the second signal or an oscillating circuit whose oscillating frequency is alternately switched.

The above objects are also achieved by a receiving/transmitting apparatus which generates the first signal and the second signal in conformity with direct frequency synthesis which does not include a frequency-mixing process.

In the receiving/transmitting apparatus as described above, the first signal and the second signal are generated alternately without any means for constantly or continuously generating a local-frequency signal being provided.

The above objects are also achieved by a receiving/transmitting apparatus which generates the first signal and the second signal in conformity with direct frequency synthesis which includes a frequency-mixing process and in which a leak in a local-frequency signal used for the frequency-mixing is suppressed to such an extent that the components of a reception wave can be separated with desirable precision.

In the receiving/transmitting apparatus as described above, even with means for constantly or continuously generating the local-frequency signal, the first signal and the second signal are alternately generated without any means provided for setting loose coupling or shielding coupling with the means.

The above objects are also achieved by a receiving/transmitting apparatus which generates the first signal and the second signal, in conformity with indirect frequency synthesis or frequency synthesis including a process of the indirect frequency synthesis. The indirect frequency has responsiveness such that the phase of the second signal is fixed with a desirable precision at the starting point of a period during which a reception wave to be separated at its every phase relative to the first signal or the second signal, arrives.

In the receiving/transmitting apparatus as described above, the first signal and the second signal are generated by a low-priced, general-purpose phase lock oscillator as long as the indirect frequency synthesis is achieved in a short lock-up time where the above-described condition can be satisfied.

The above objects are also achieved by a receiving/transmitting apparatus where the components of each reception wave separated at its every phase relative to the first signal or the second signal are integrated in parallel at its every phase.

In the receiving/transmitting apparatus as described above, the integrating processing is performed for each group of components of the reception waves which have the same phase and are received from a target as responses to emission waves intermittently transmitted at the same phase level every time.

The above objects are also achieved by a radar equipment along with the above receiving/transmitting apparatus. The radar equipment performs signal processing associated with measurement of all or a part of the characteristic of a medium interposed between the radar equipment and its target, a relative distance and a relative position to the target, and a relative speed and a size of the target, based on the components of a reception wave which is separated at its every phase relative to an emission wave by the receiving/transmitting apparatus.

In the radar equipment as described above, the above signal processing is performed for each group of components of the reception wave having the same phase, based on various digital signal processing such as integration, correlation, and others.

The above objects are also achieved by a radar equipment which identifies a target based on the measurement result.

In the radar equipment as described above, the measurement is performed with efficiency and high reliability even when a reception wave is very weak, as long as the characteristic of a propagation path, which is interposed between the radar equipment and a target, for an emission wave and the reception wave, a time required for the target to respond, and the characteristic of the target do not vary.

The above objects are also achieved by a radar equipment along with the above receiving/transmitting apparatus. The radar equipment performs signal processing associated with measurement of all or a part of the characteristic, shape, size, and material of medium through which an emission wave and a reception wave propagate, based on the components of the reception wave which is separated at its every phase relative to the emission wave by the receiving/transmitting apparatus.

In the radar equipment as described above, its target is identified by performing processing such as integration, correlation, and others on the phase discriminated with high precision so that reliability and precision in target identification are highly maintained.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 5 is a chart explaining an effect achieved by this embodiment;

DESCRIPTION OF THE PREFERRED EMBODIMENTS

The principles of a receiving/transmitting apparatus and a radar equipment according to the present invention are first explained below with reference to FIG. 1.

Figure 1:
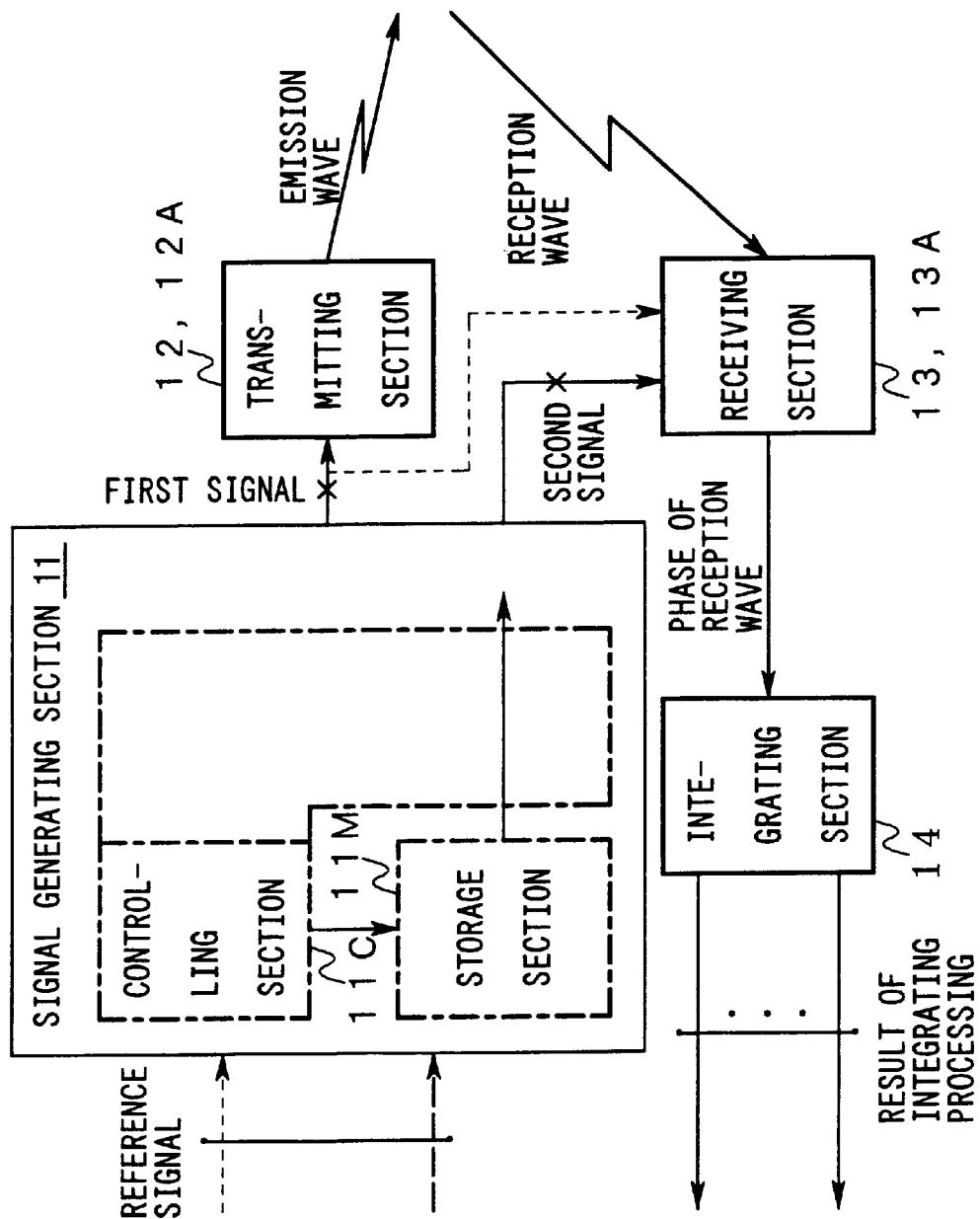
FIG. 1 is a block diagram showing a principle of a receiving/transmitting apparatus according to the present invention.

FIG. 1 is a block diagram showing the principle of the receiving/transmitting apparatus according to the present invention.

The receiving/transmitting apparatus shown in FIG. 1 is composed of a signal generating section 11 including a controlling section 11C and a storage section 11M, a transmitting section 12 or 12A, a receiving section 13 or 13A, and an integrating section 14.

The principle of a first receiving/transmitting apparatus according to the present invention is described as follows.

The signal generating section 11 alternately generates the first signal and the second signal whose frequencies are different from each other and whose phases have fixed initial values. The transmitting section 12 generates an emission wave according to the first signal and radiates the emission wave. The receiving section 13 according to the second signal, heterodyne—detects a reception wave arriving as a response to the emission wave which is radiated by the transmitting section 12 to discriminate a phase of the reception wave.

In other words, an initial value of a phase of the emission wave which is radiated by the transmitting section 12 is maintained at a fixed value every time the emission wave is transmitted, eve n though the signal generating section 11 is commonly used for the generation of the emission wave and the heterodyne detection of the aforesaid reception wave.

Consequently, it is possible to obtain the phase of the reception wave with high reliability so that the relative position, the speed, and so on of a target object are precisely computed by performing predetermined processing on the phase of the reception wave without causing any substantial enlargement in hardware scale.

The principle of a second receiving/transmitting apparatus according to the present invention is described as follows.

The signal generating section 11 alternately generates the first signal and the second signal whose frequencies are different from each other and whose phases have different fixed initial values. The transmitting section 12A radiates the first signal as an emission wave. The receiving section 13A, based on the second signal, heterodyne—detects a reception wave arriving as a response to the emission wave which is radiated by the transmitting section 12A to discriminate a phase of the reception wave.

In other words, an initial value of a phase of the emission wave which is radiated by the transmitting section 12A is maintained at a fixed value every time the emission wave is transmitted, even though the signal generating section 11 is commonly used for the generation of the emission wave and the heterodyne detection of the aforesaid reception wave.

Consequently, it is possible to obtain the phase of the reception wave with high reliability so that the relative position, the speed, and so on of a target object are precisely computed by performing predetermined processing on the phase of the reception wave without causing any substantial enlargement in hardware scale.

The principle of a third receiving/transmitting apparatus according to the present invention is described as follows.

The signal generating section 11 alternately performs frequency synthesis according to two different synthetic ratios, in response to reference signals with a fixed frequency to generate the first signal and the second signal respectively.

In other words, the frequency synthesis according to the different synthetic ratios is performed for the reference signals having a common frequency to generate the first signal which is used in generating an emission wave or corresponds to the emission wave and the second signal which is used in receiving a reception wave.

Consequently, hardware structure is simplified compared with a case where the first signal and the second signal are generated by performing frequency synthesis for reference signals having different frequencies which correspond to the first signal and the second signal respectively.

In a fourth receiving/transmitting apparatus according to the present invention, a sequence of instantaneous values of signals corresponding to the first signal and the second signal respectively are stored in the storage section 11M in advance. The controlling section 11C reads, during periods in which the first signal and the second signal are to be generated respectively, the sequence of the instantaneous values which are stored in storage areas of the storage section 11M corresponding to the respective periods, to generate the first signal and the second signal.

In other words, the first signal and the second signal are generated as the sequence of the instantaneous values which are stored in the storage section 11M in advance and read so that the first signal and the second signal are obtainable constantly compared with a case where the first signal and the second signal are generated by an oscillating circuit for intermittently oscillating the first signal and/or the second signal or an oscillating circuit whose oscillating frequency is alternately switched.

Therefore, desirable function and performance are stably and reliably obtained in the process of signal processing which is performed on the components of a reception wave.

In a fifth receiving/transmitting apparatus according to the present invention, the signal generating section 11 alternately performs frequency synthesis according to fixed synthetic ratios, in response to two reference signals with different frequencies, to generate the first signal and the second signal respectively.

In other words, switching of frequencies of the first signal used in generating an emission wave or corresponds to the emission wave and the second signal used in receiving a reception wave is realized as updating of an oscillating frequency of means for generating the above-mentioned reference signals.

Consequently, hardware structure is simplified as long as processing to be performed for the reference signals in the process of the above frequency synthesis is consistent with frequencies of the first signal and the second signal.

In a sixth receiving/transmitting apparatus according to the present invention, the signal generating section 11 alternately performs frequency synthesis according to two different synthetic ratios, in response to two reference signals with different frequencies, to generate the first signal and the second signal respectively.

In other words, a frequency of the first signal which is used in generating an emission wave or corresponds to the emission wave and a frequency of the second signal which is used in receiving a reception wave are set based on the combination of an oscillating frequency of means for generating the two reference signals, and the synthetic ratios.

This enables the structures of the reference signal generating sections 11, 11A to flexibly adapt to frequencies of the emission wave and the reception wave to be received. In a seventh receiving/transmitting apparatus according to the present invention, the signal generating section 11 generates the first signal and the second signal in conformity with direct frequency synthesis which does not include a frequency-mixing process.

In other words, the first signal and the second signal are generated alternately without any means for constantly or continuously generating a local-frequency signal being provided besides the signal generating section 11.

Consequently, highly precise signal processing is stably realized without any means provided for setting loose coupling or shielding coupling with means for generating the local-frequency signal.

In an eighth receiving/transmitting apparatus according to the present invention, the signal generating section 11 generates the first signal and the second signal in conformity with direct frequency synthesis which includes a frequency-mixing process and in which leak of a local-frequency signal used in the frequency-mixing is suppressed to such an extent that components of a reception wave is separated with desirable precision by the receiving sections 13, 13A.

In other words, the first signal and the second signal are alternately generated without any means provided for setting loose coupling or shielding coupling with means for generating the local-frequency signal, even when means for constantly or continuously generating the local-frequency signal is provided in addition to the signal generating section 11.

Consequently, highly precise signal processing is stably achieved.

In a ninth receiving/transmitting apparatus according to the present invention, the signal generating section 11 generates the first signal and the second signal, in conformity with indirect frequency synthesis or frequency synthesis including a process of the indirect frequency synthesis, the indirect frequency synthesis having responsiveness such that the phase of the second signal is fixed with desirable precision at the starting point of a period during which a reception wave whose phase is to be discriminated arrives.

In other words, the first signal and the second signal are generated by a low-priced, general-purpose phase lock oscillator as long as the indirect frequency synthesis is achieved in such a short lock-up time that the above-described condition is satisfied.

Consequently, structure simplification as well as price reduction is realized.

In a tenth receiving/transmitting apparatus according to the present invention, the integrating section 14 integrates, in parallel, components of individual reception waves which are separated by the receiving sections 13, 13A at every phase relative to the first signal or the second signal.

The integrating processing described above is performed for each group of components of the reception waves having a common phase and arriving from a target as responses to emission waves which are intermittently and every time transmitted at the same phase level.

Consequently, the reception wave is detected efficiently and highly reliably even when the reception wave is very weak, as long as the characteristic of a propagation path of the emission wave and the reception wave which is formed between the transmitting sections 12, 12A and a target and between the receiving sections 13, 13A and the target, the time required for the target to respond, and the characteristic of the target do not vary.

Figure 2:
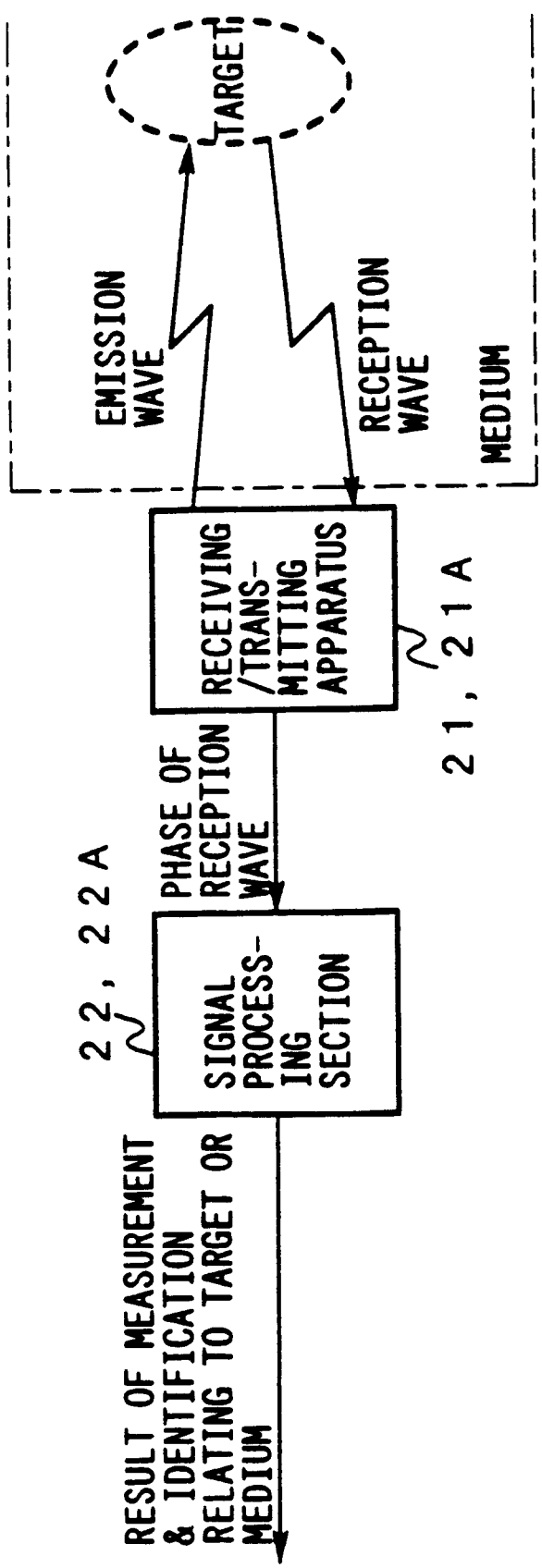
FIG. 2 is a block diagram showing a principle of a radar equipment according to the present invention.

FIG. 2 is a block diagram showing a principle of a radar equipment according to the present invention.

The radar equipment shown in FIG. 2 is composed of a receiving/transmitting apparatus 21 or 21A and a signal processing section 22 or 22A.

In a first radar equipment according to the present invention, the receiving/transmitting apparatus 21A which corresponds to the first to tenth receiving/transmitting apparatuses described above, receives as a reception wave a reflected wave occurring in a medium through which a radiated emission wave propagates, or a signal radiated by the medium in response to the emission wave. The signal processing section 22A performs signal processing related to measurement of all or a part of the characteristic, shape, size, and material of the above medium based on components of the reception wave which is separated by the receiving/transmitting apparatus 21A at every phase relative to the emission wave.

The signal processing described above is performed for each group of components having a common phase based on various digital signal processing such as integration, correlation, and others.

Therefore, the measurement mentioned above is realized with efficiency and high reliability even when the reception wave is very weak, regardless of the medium, which corresponds to a propagation path for the emission wave and the reception wave.

In a second radar equipment according to the present invention, the receiving/transmitting apparatus 21 which corresponds to the first to tenth receiving/transmitting apparatuses described above, receives as a reception wave a reflected wave occurring in a target in response to a radiated emission wave or a signal radiated by the target in response to the emission wave. The signal processing section 22 performs signal processing related to measurement of all or a part of the characteristic of a medium interposed between the receiving/transmitting apparatus 21 and the target, a relative distance and a relative position to the target, and a relative speed and a size of the target, based on a phase discriminated by the receiving/transmitting apparatus 21.

Therefore, the above measurement is achieved with efficiency and high reliability even when the reception wave is very weak, as long as the characteristic of the propagation path for the emission wave and the reception wave, which is interposed between the receiving/transmitting apparatus 21 and the target, a time required for the target to respond, and the characteristic of the target do not vary.

In a third radar equipment according to the present invention, the signal processing section 22 identifies a target based on the measurement result obtained in signal processing.

Since the target identification is achieved by performing processing such as integration, correlation, and others on a phase discriminated with high precision, reliability and precision in the target identification are highly maintained in any of the following cases:

the target is too small for a reflector of an emission wave;

a relative distance to the target is extremely long;

excessive disturbance is superimposed on an emission wave and a reception wave;

attenuation in a propagation path formed between the receiving/transmitting apparatus and the target is extremely large; and a characteristic (including the attenuation) of the propagation path may possibly vary to a great extent.

Embodiments of the present invention are explained in detail below with reference to the drawings.

Figure 3:
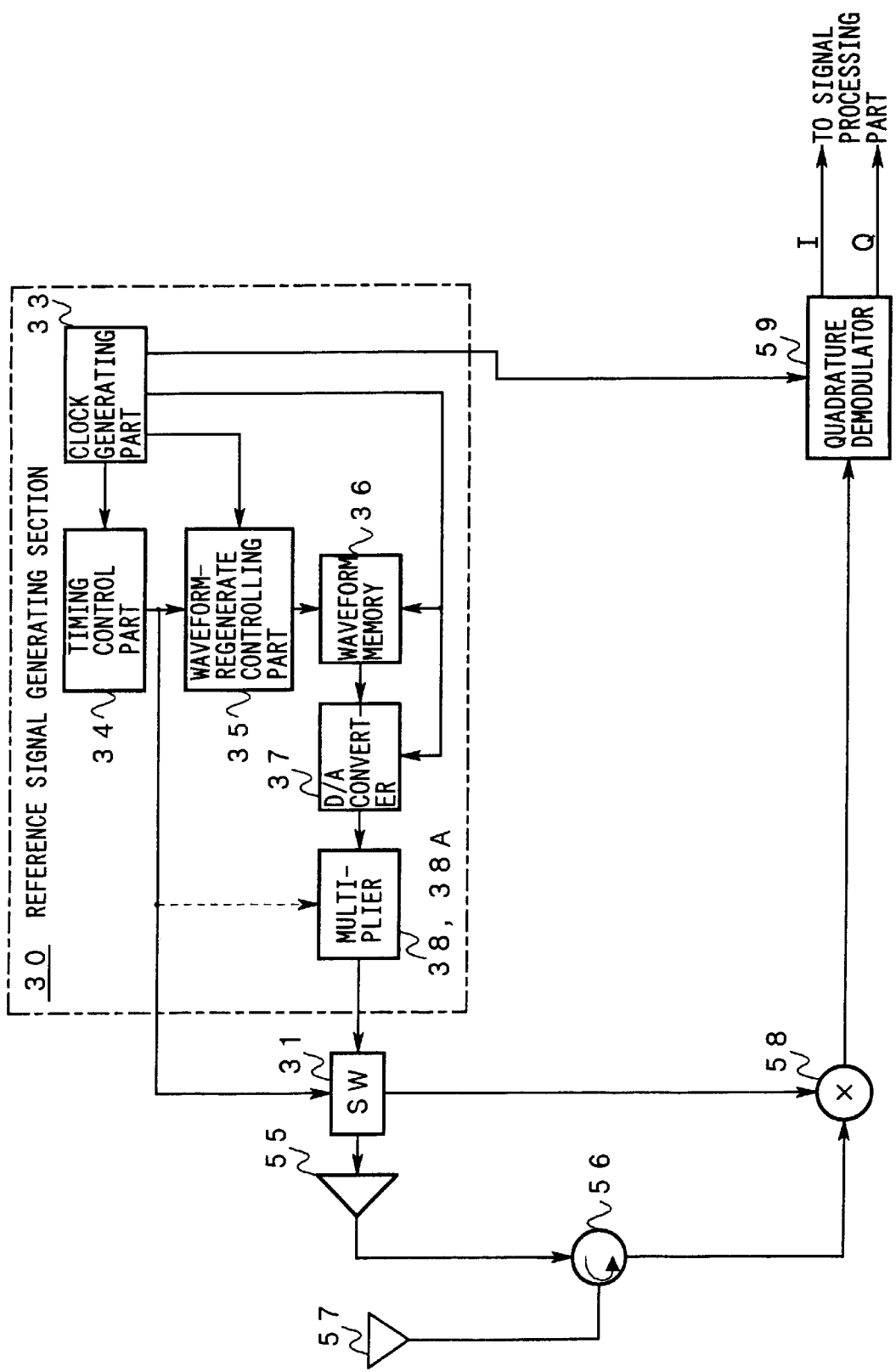
FIG. 3 is a diagram showing a first embodiment and a second embodiment of the present invention.

FIG. 3 is a diagram showing a first embodiment and a second embodiment of the present invention.

Figure 9:
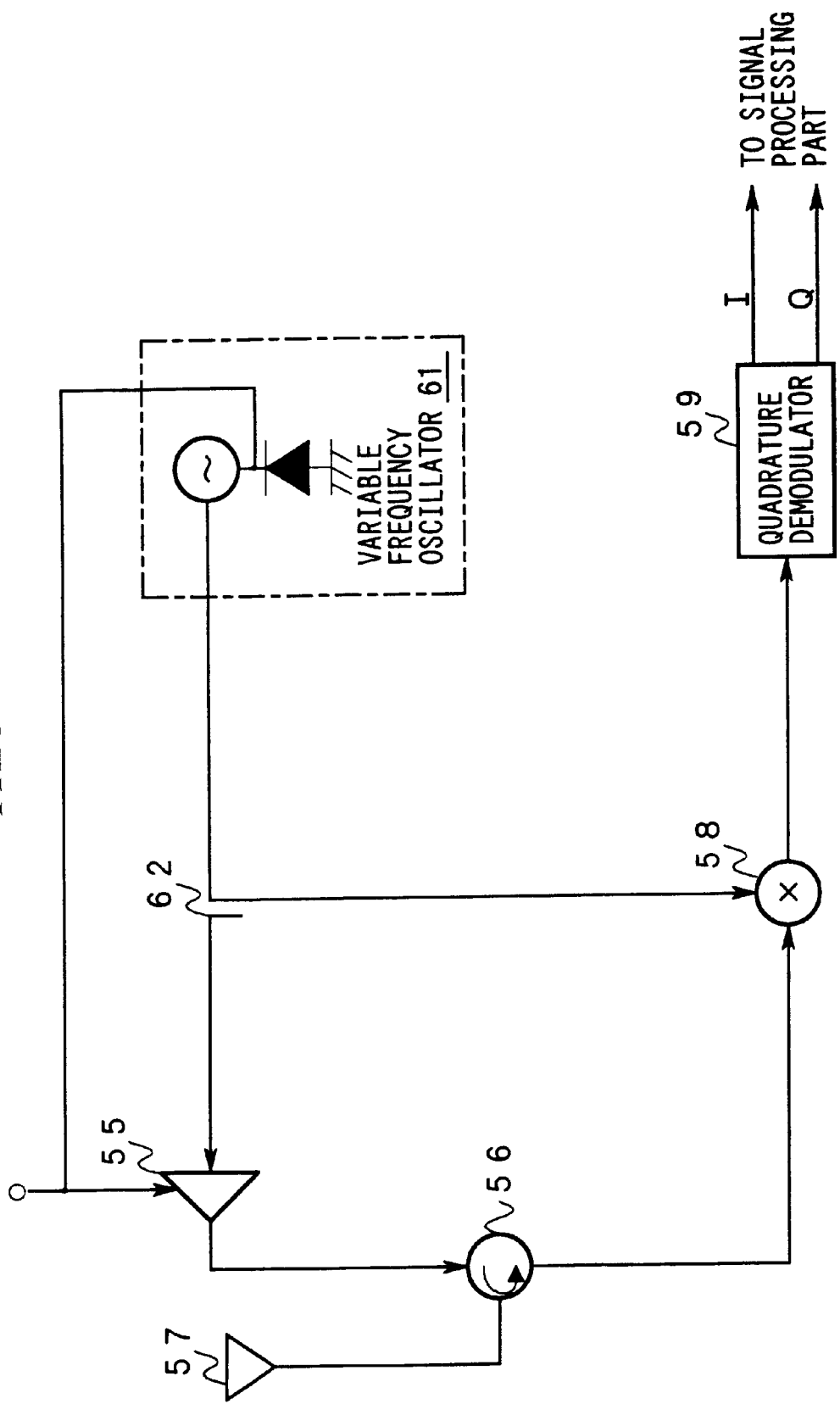
FIG. 9 is a diagram showing a second structure example of the radar equipment to which the signal processing technique is applied.
Figure 10A:
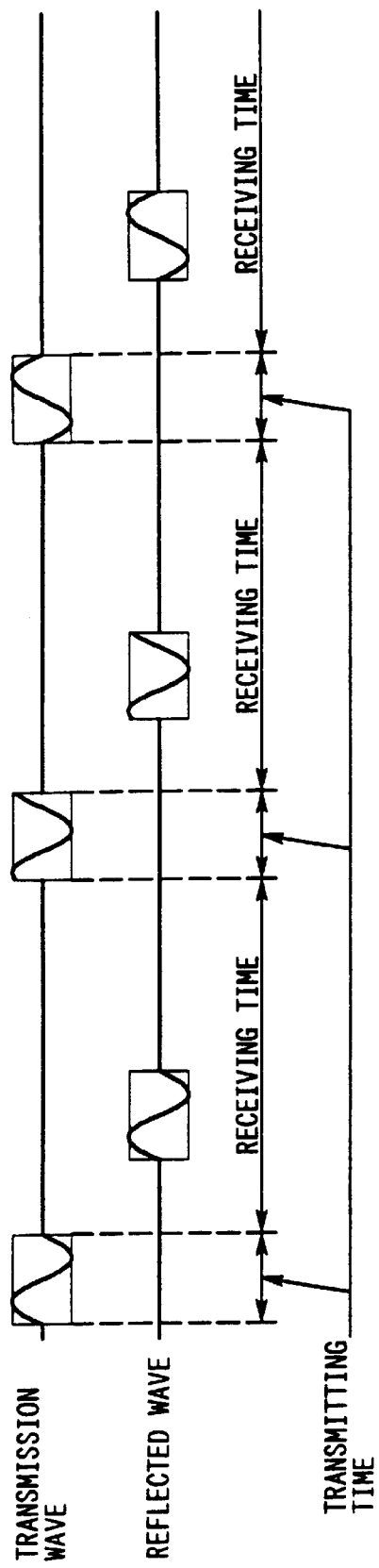
FIG. 10 is a chart explaining a problem of a conventional example.
Figure 10B:
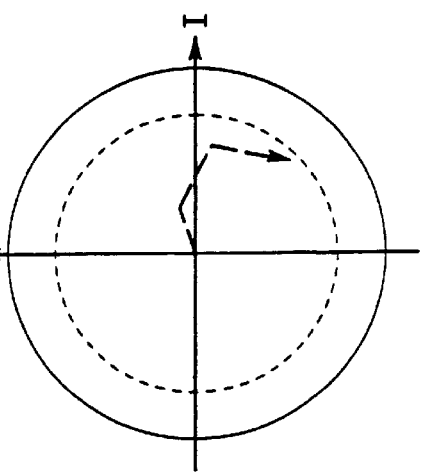

In FIG. 3, the same numerals and symbols are used to designate elements having the same structure as those shown in FIG. 9 and explanations thereof are omitted here.

Note that the numeral '30' denotes a reference signal generating part. The numeral '31' denotes a switch which operates under the control of the reference signal generating part 30.

The reference signal generating part 30 is composed of the following elements.

a clock generating part 33 having a first output connected to a carrier input of a quadrature demodulator 59 a timing control part 34 having an input connected to a second output of the clock generating part 33 and an output connected to a control input of the switch 31 a waveform-regenerate controlling part 35 having two inputs connected to the output of the timing control part 34 and a third output of the clock generating part 33 respectively a waveform memory 36 having a control input connected to an output of the waveform-regenerate controlling part 35 and a clock terminal connected to a fourth output of the clock generating part 33 a D/A converter 37 having a clock terminal connected to a fourth output of the clock generating part 33 and an input connected to an output of the waveform memory 36 a multiplier 38 having an input connected to an output of the D/A converter 37 and an output connected to an input of the switch 31

Figure 4:
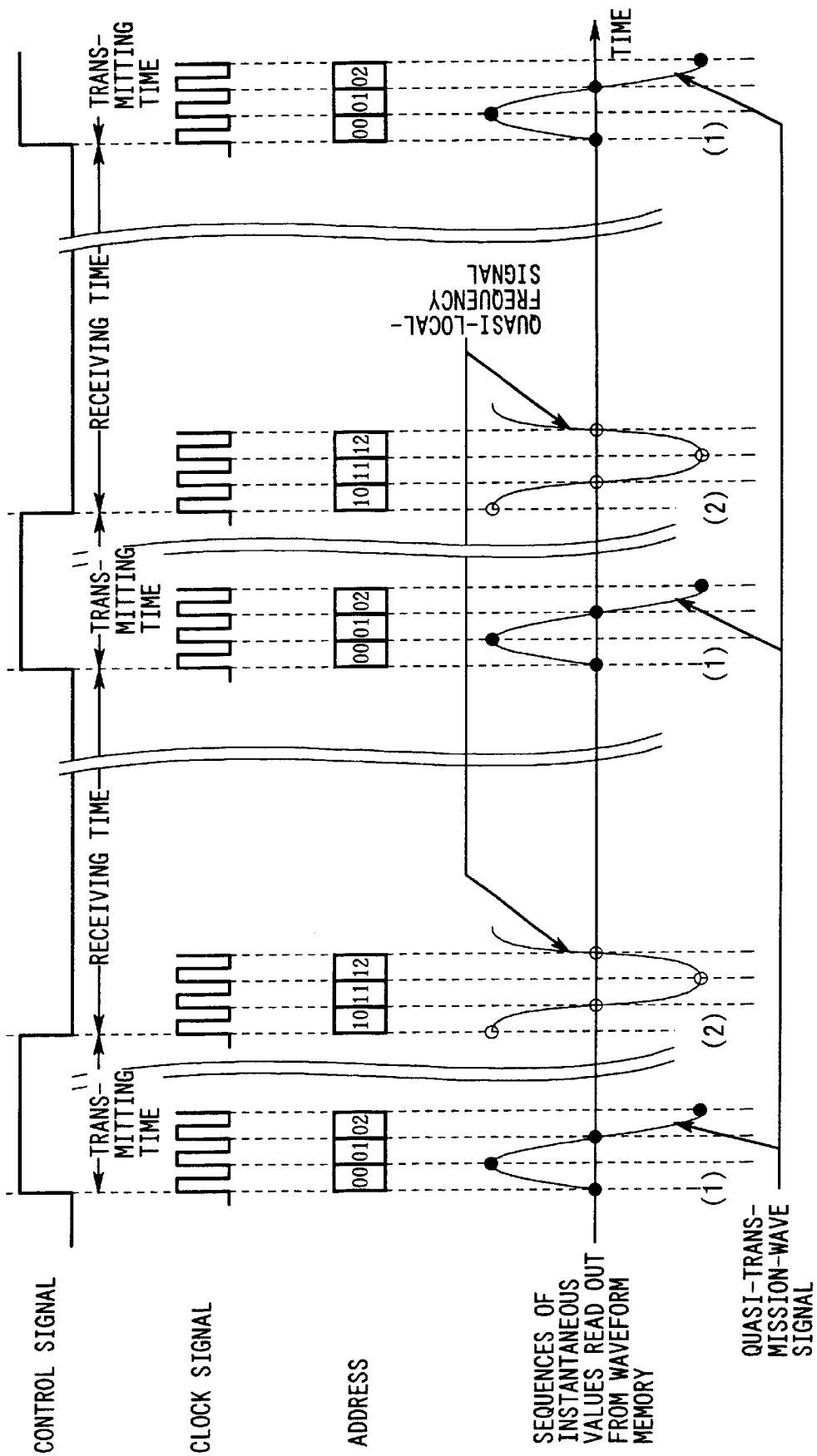
FIG. 4 is a chart explaining operations of the first embodiment of the present invention.

FIG. 4 is a chart explaining operations of the first embodiment according to the present invention.

The operations of the first embodiment according to the present invention are explained below with reference to FIG. 3 and FIG. 4.

The waveform memory 36 has a first storage area and a second storage area in which data strings which are read during the aforesaid transmitting time and the receiving time respectively are stored respectively. More specifically, a sequence of instantaneous values of the following two signals are stored in advance in these storage areas respectively.

a 'quasi-transmission wave signal' utilized as a frequency reference in generating a transmission wave to be radiated from an antenna 57 during the transmitting time a 'quasi-local-frequency signal' utilized as a frequency reference in generating a local-frequency signal to be fed to a mixer 58 during the receiving time Note that frequencies of the 'quasi-transmission wave signal' and the 'quasi-local-frequency signal' are hereinafter supposed to be 50 megahertz and 50.05 megahertz respectively for simplification.

The clock generating part 33 constantly generates a clock signal with a predetermined frequency (supposed to be 60 megahertz here for simplification).

The timing control part 34 divides the clock signal to generate a control signal signifying the aforesaid transmitting time and the receiving time by logical values at a predetermined duty factor.

The waveform-regenerate controlling part 35 identifies starting points of the transmitting time and the receiving time which alternately occur according to a change in the logical values of the control signal to generate an address signal indicating the following strings of addresses which are updated at a cycle of the clock signal during the transmitting time and the receiving time respectively.

a string of addresses signifying in sequence a top storage area and a series of storage areas subsequent to the top storage area in the first storage area of the waveform memory 36 a string of addresses signifying in sequence a top storage area and a series of storage areas subsequent to the top storage area in the second storage area of the waveform memory 36

The waveform memory 36 outputs the sequence of the instantaneous values which are stored in advance in the storage areas signified by these addresses.

Therefore, signals signified by the sequence of the instantaneous values correspond to the quasi-transmission wave signal whose phase at the starting point of the transmitting time (FIG. 4(1)) is set at a fixed value and the quasi-local-frequency signal whose phase at the starting point of the receiving time (FIG. 4(2)) is set at a fixed value, as shown by the black circles and the white circles in FIG. 4.

The D/A converter 37 converts the quasi-transmission wave signal and the quasi-local-frequency signal to analog signals. The multiplier 38 multiplies frequencies of the analog signals by 200 to generate a composite signal which corresponds to a transmission wave signal with a frequency of 10000 (=50×200) megahertz during the transmitting time and corresponds to a receiving local-frequency signal with a frequency of 10010 (=50.05×200) megahertz during the receiving time.

The switch 31 distinguishes the transmission wave signal from the receiving local-frequency signal which are included in the composite signal according to the aforesaid logical values of the control signal and distributes the transmission wave signal and the receiving local-frequency signal to the power amplifier 55 and the mixer 58 respectively.

Incidentally, processing performed by the power amplifier 55, a circulator 56, the antenna 57, and the mixer 58 operating together is basically the same as that performed in the second conventional example and therefore, explanations thereof are omitted below.

In other words, the transmission wave signal and the receiving local-frequency signal are generated in the transmitting time and the receiving time respectively by a single reference signal generating part 30, but an initial value of a phase of the transmission wave signal at the starting point of the transmitting time (FIG. 5(*a*)(1)) and an initial value of a phase of the receiving local-frequency signal at the starting point of the receiving time (FIG. 5(*a*)(2)) are maintained at fixed values.

Therefore, the quadrature demodulator 59 is capable of classifying components of a received reflected wave at its every phase relative to the clock signal which is generated by the clock generating part 33 and phase-locked with the transmission wave in this embodiment.

Consequently, in signal processing processes, phases are discriminated and precision in the signal processing is improved so that sensitivity, resolution, and other performance are enhanced as shown by the arrow depicted by the solid line in FIG. 5(*b*).

The second embodiment of the present invention is explained below.

This embodiment is characterized in that a multiplier 38A having a control terminal which is connected to the output of the timing control part 34 as shown by the arrow depicted by the broken line in FIG. 3 is provided.

The operations of the second embodiment according to the present invention are explained below with reference to FIG. 3.

In this embodiment, the multiplier 38A is initialized at each of a rising instant and a falling instant of the control signal, which is fed by the timing control part 34, and sets a multiplying ratio at different values M1, M2 (for example, '200' and '201) during the transmitting time and the receiving time corresponding to the logical values of the control signal respectively.

In other words, similarly to the first embodiment described above, the phases of the transmission wave signal and the receiving local-frequency signal at the starting points of the transmitting time and the receiving time are maintained at fixed values and both of the frequencies of the transmission wave signal and the receiving local-frequency signal are set at desirable values even when the frequencies of the quasi-transmission wave signal and the quasi-local-frequency signal which are given as the sequence of the instantaneous values by the waveform memory 36 have the same value.

As a result, according to this embodiment, coherency is secured without any great enlargement in hardware scale even when word lengths of the instantaneous values to be stored in the waveform memory 36 and the number of the instantaneous values are large.

Figure 6:
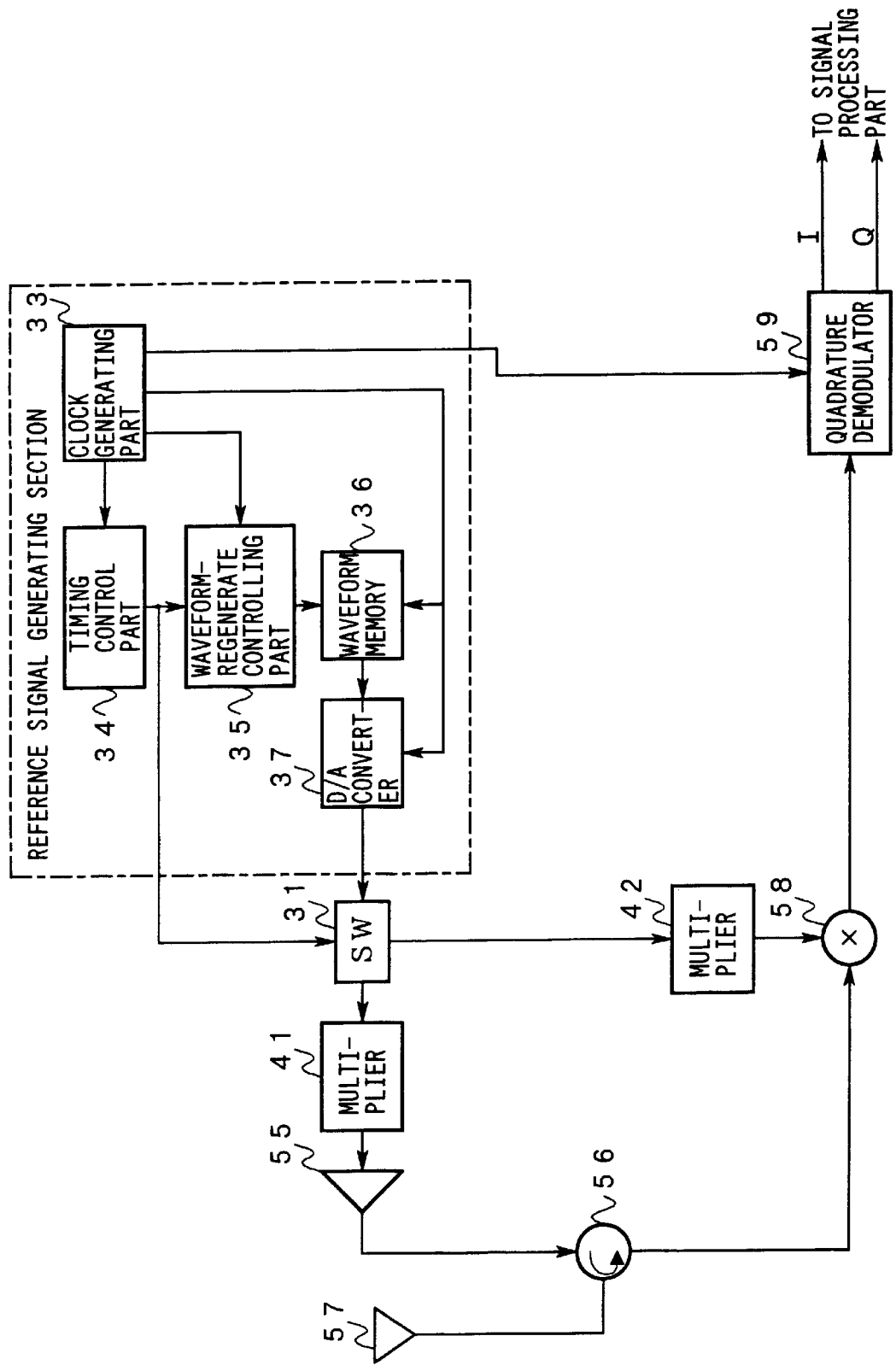
FIG. 6 is a diagram showing a third embodiment of the present invention.

FIG. 6 is a diagram showing a third embodiment of the present invention.

The characteristics of this embodiment are as follows.

The output of the D/A converter 37 is connected to an input of the switch 31 instead of the output of the multiplier 38A.

A multiplier 41 is provided on an interstage between the switch 31 and the power amplifier A multiplier 42 is provided on an interstage between the switch 31 and the mixer 58.

Operations of the third embodiment according to the present invention are explained below with reference to FIG. 6.

The quasi-transmission wave signal and the quasi-local-frequency signal which are converted to the analog signals are obtained during the transmitting time and the receiving time respectively at the output of the D/A converts in the second embodiment described above.

The switch 31 discriminates between the transmitting time and the receiving time according to the logical values of the control signal which is given by the timing control part 34 and it gives the quasi-transmission wave signal to the multiplier 41 during the transmitting time and the quasi-local-frequency signal to the multiplier 42 during the receiving time.

Meanwhile, multiplying ratios of the multipliers 41, 42 are set at fixed values '200' and '201' in advance respectively and the multipliers 41, 42 multiply the quasi-transmission wave signal by 200 during the transmitting time to generate the transmission wave and multiply the quasi-local-frequency signal by 201 during the receiving time to generate the receiving local-frequency signal.

In other words, the transmission wave and the receiving-local-frequency signal with desirable frequencies are generated by the two multipliers 41, 42 which are provided to substitute for the multiplier 38A provided in the second embodiment described above and whose multiplying ratios are set at fixed values.

Therefore, according to this embodiment, similarly to the first and second embodiments described above, coherency is secured to improve precision in signal processing to be performed for the reflected wave and to enhance sensitivity, resolution, and other performance as radar under a different structure from the structures in the first and second embodiments described above.

Incidentally, the frequencies of the quasi-transmission wave signal and the quasi-local-frequency signal which are given as the sequence of the instantaneous values by the waveform memory 36 during the transmitting time and the receiving time are set at the same value in the second and third embodiments described above.

However, the present invention is not limited to this structure and the multiplying ratios of the multiplier 38A or the multipliers 41, 42 during the transmitting time and the receiving time and the frequencies of the quasi-transmission wave signal and the quasi-local-frequency signal may be set at appropriate values which tolerate, for example, levels of distortion which may possibly be included in the quasi-transmission wave signal and the quasi-local-frequency signal or may be set at values which downsize the storage areas of the waveform memory 36 within a range of the word lengths of the storage areas.

Furthermore, in each of the above described embodiments, the data in the first memory area and the second memory area of the waveform memory 36 is read with reliability from the top storage areas of these storage areas during the transmitting time and the receiving time so that the initial values of the phases of the transmission wave signal and the receiving local-frequency signal are maintained at fixed value.

However, the present invention is not limited to this structure and, for example, either one of the following reference signal generating parts may be provided to substitute for the reference signal generating part 30.

- a reference signal generating part composed of a single or a plurality of blocking oscillator(s) in which starting conditions are kept unchanged
- a reference signal generating part which does not perform a frequency-mixing and performs direct frequency synthesis
- a reference signal generating part which performs the direct frequency synthesis having the frequency-mixing process to maintain the phases of the transmission wave signal and the receiving local-frequency signal at the starting points of the transmitting time and the receiving time at fixed values with desirable precision and which performs
- a reference signal generating part which performs indirect frequency synthesis to maintain the phases of the transmission wave signal and the receiving local-frequency signal at the starting points of the transmitting time and the receiving time at fixed values with desirable precision Moreover, the frequencies of the quasi-transmission wave signal and the transmission wave signal are maintained at fixed values throughout the transmitting time in each of the above-described embodiments.

However, the present invention is not limited to this structure and is applicable to radar, for example, pulse compression radar, in which desirable performance is achieved by varying the frequencies of the quasi-transmission wave signal or the transmission wave signal.

In each of the above-described embodiments, integrating processing is performed for each group of components of the reflected wave having a common phase, by a signal processing part which is provided on a subsequent stage of the quadrature modulator 59.

Figure 7:
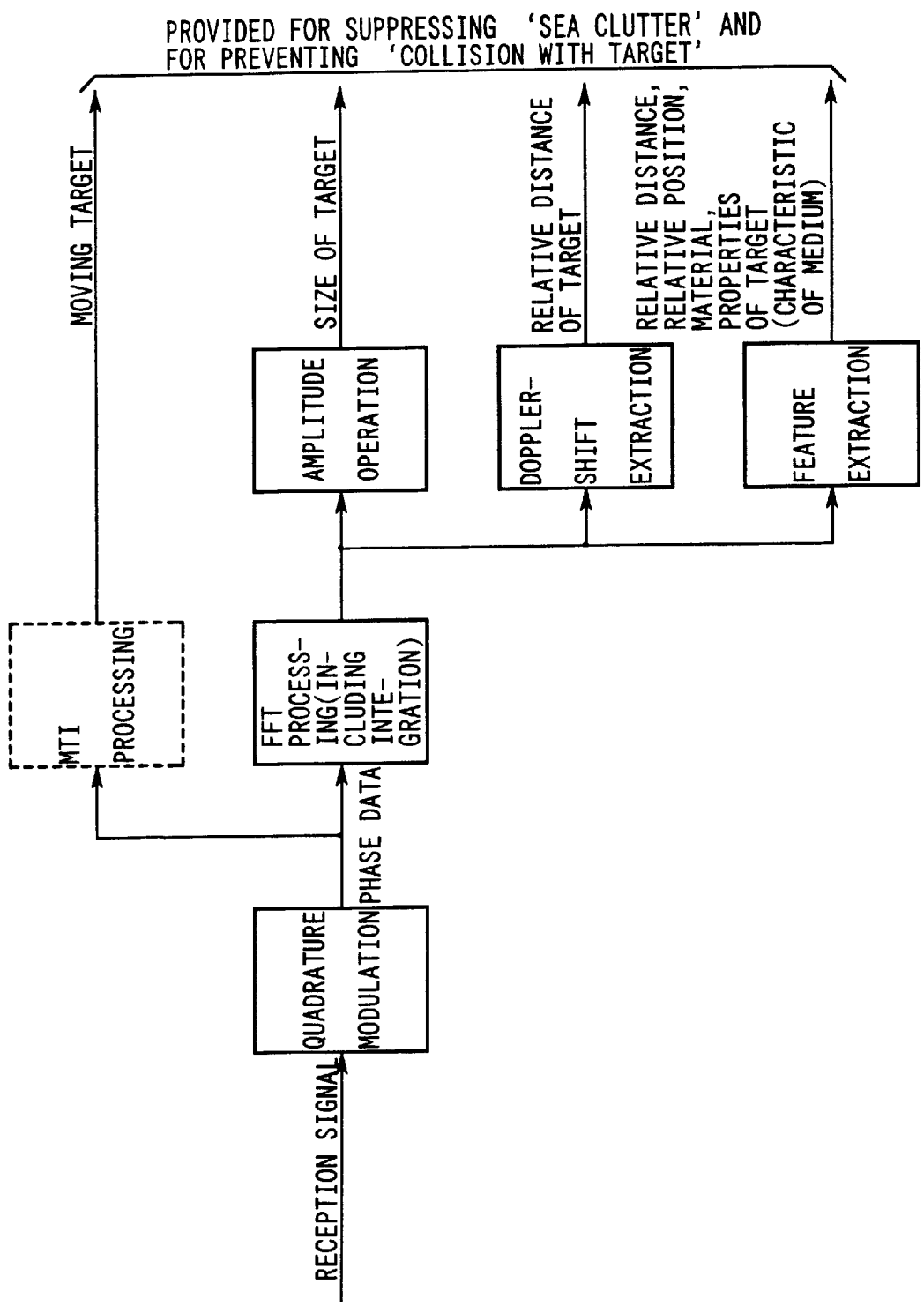
FIG. 7 is a diagram showing processes of computation to be performed in a signal processing part.
Figure 8:
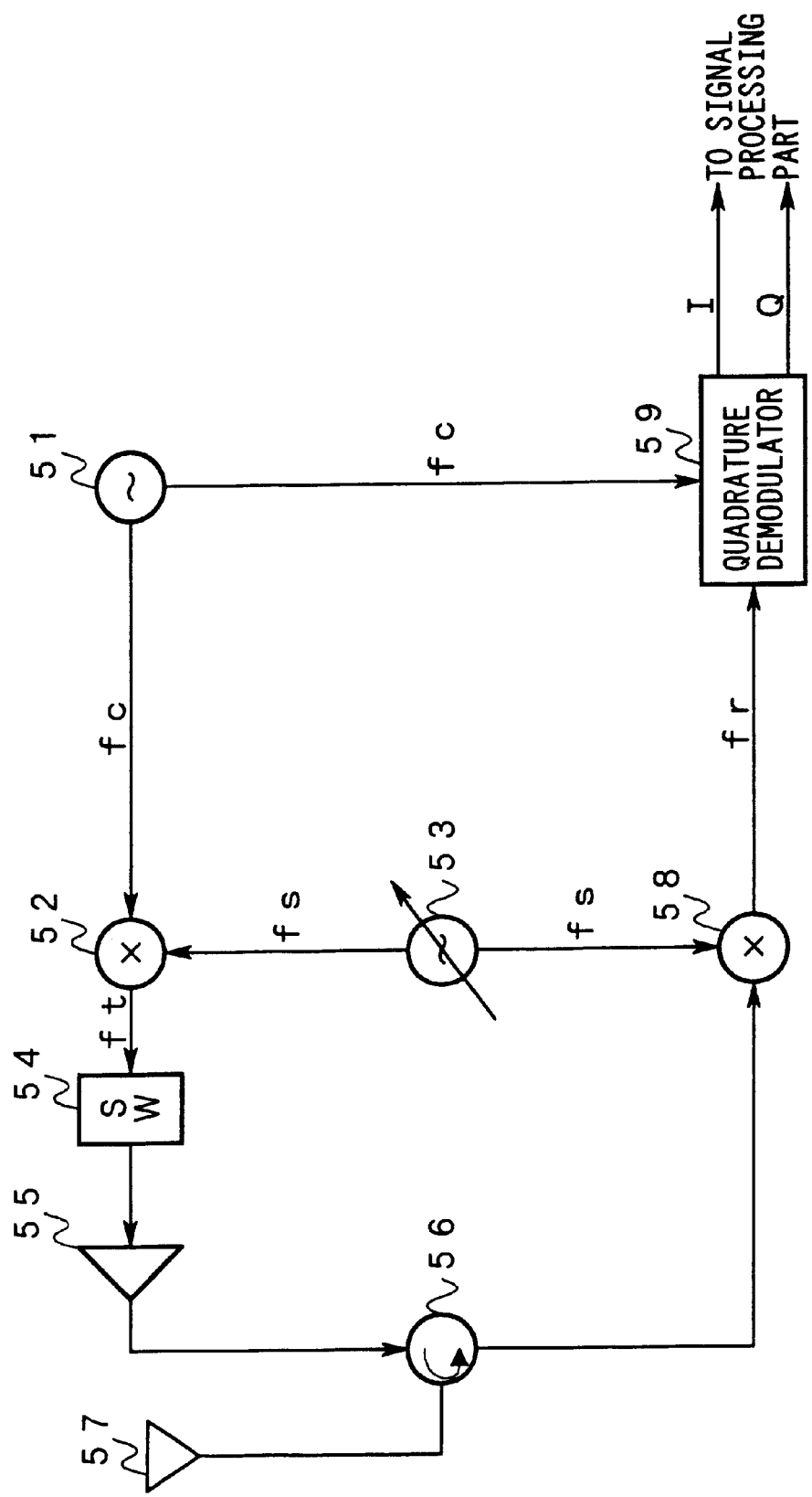
FIG. 8 is a diagram showing a first structure example of a radar equipment to which a signal processing technique is applied.

However, processing to be performed in this signal processing part may be any of the processing listed below, for example, as shown in FIG. 7.

- processing for discriminating only components whose Doppler shifts exceed a predetermined minimum value, out of components of phase information I, Q obtained by the quadrature modulator 59 to realize MTI (Moving Target Indicator)
- processing for computing 'a size of a target' according to an average value $(=(I+Q^2)^{1/2})$ of the phase information I, Q
- processing for computing 'a relative speed of a target' according to the aforesaid Doppler shift
- processing for computing 'a relative distance of a target' according to relative delay time at an instant when the reflected wave which is signified by the phase information I, Q is received in response to the transmission wave signal
- processing for computing 'a relative position of a target' according to a combination of a direction from which the reflected wave arrives and the above-mentioned 'relative distance of a target'
- processing for realizing all or a part of identification of 'a specific target', measurement of 'a characteristic of a medium which is interposed between the receiving/transmitting apparatus and a target', elimination of 'a reflected wave arriving from a distributed target such as a sea clutter and so on', and prevention or avoidance of 'a collision with a target' based on correlation between a predetermined reference and distribution of a frequency spectrum (the Doppler shift may be included) of the phase information I, Q and/or information which is secondarily radiated by the target in response to the aforesaid transmission wave signal and which is signified by a signal arriving as the reception wave In each of the embodiments described above, the present invention is applied to pulse radar.

However, the present invention is not limited to be applied to such pulse radar and is applicable, for example, to Doppler radar and secondary radar in which emission wave and reflected wave do not always have the same frequency, and such radar may be not only utilized for navigation aids of watercrafts and aircrafts but also may be applied to any field such as weather, monitoring, controlling, and others.

In each of the above-described embodiments, the transmission wave and the reflected wave are both radio waves.

However, the present invention is not limited to be applied to such a radar equipment and is also applicable, for example, to a depth sounder, a fish finder, a seismic profiling device, a sonar, a flaw detector, an ultrasonic diagnostic equipment, and other various apparatuses and systems, as long as the emission wave and/or the reflected wave are/is an ultrasonic wave or a laser beam and measurement of a desirable medium and object is realized based on either of a pulse echo method, Doppler navigation, a pulse transmission method, and a resonance method.

The invention is not limited to the above embodiments and various modifications may be made without departing from the spirit and the scope of the invention. Any improvement may be made in part or all of the components.

What is claimed is:

1. A receiving/transmitting apparatus comprising:
    a signal generating section for alternately generating a first signal and a second signal having different frequencies from each other and their phases at fixed initial values;
    a transmitting section for radiating an emission wave generated based on the generated first signal; and
    a receiving section for heterodyne-detecting a reception wave received as a response to the radiated emission wave to discriminate the phase of the reception wave by using the generated second signal.

2. A receiving/transmitting apparatus comprising:
    a signal generating section for alternately generating a first signal and a second signal having different frequencies from each other and their phases at fixed initial values;
    a transmitting section for radiating the generated first signal as an emission wave; and
    a receiving section for heterodyne-detecting a reception wave received as a response to the radiated emission wave to discriminate the phase of the reception wave by using the generated second signal.

3. The receiving/transmitting apparatus according to claim 1, wherein
    said signal generating section respectively generates the first signal and the second signal by alternately performing frequency synthesis in response to a reference signal having a fixed frequency, the frequency synthesis being according to two different synthetic ratios.

4. The receiving/transmitting apparatus according to claim 2, wherein said signal generating section respectively generates the first signal and the second signal by alternately performing frequency synthesis in response to a reference signal having a fixed frequency, the frequency synthesis being according to two different synthetic ratios.

5. The receiving/transmitting apparatus according to claim 1, wherein
said signal generating section respectively generates the first signal and the second signal by alternately performing frequency synthesis according to a fixed synthetic ratio, in response to two reference signals having different frequencies.

6. The receiving/transmitting apparatus according to claim 2, wherein
said signal generating section respectively generates the first signal and the second signal by alternately performing frequency synthesis according to a fixed synthetic ratio, in response to two reference signals having different frequencies.

7. The receiving/transmitting apparatus according to claim 1, wherein
said signal generating section respectively generates the first signal and the second signal by alternately performing frequency synthesis in response to two reference signals having different frequencies, the frequency synthesis being according to two different synthetic ratios.

8. The receiving/transmitting apparatus according to claim 2, wherein
said signal generating section respectively generates the first signal and the second signal by alternately performing frequency synthesis in response to two reference signals having different frequencies, the frequency synthesis being according to two different synthetic ratios.

9. The receiving/transmitting apparatus according to claim 1, wherein said signal generating section comprises:
a storage section in which a sequence of instantaneous values of signals individually corresponding to the first signal and the second signal are stored in advance; and
a controlling section for reading a sequence of instantaneous values during respective periods where the first signal and the second signal are to be generated, to generate the first signal and the second signal, the sequence being stored in the storage areas of said storage section corresponding to the periods.

10. The receiving/transmitting apparatus according to claim 2, wherein said signal generating section comprises:
a storage section in which a sequence of instantaneous values of signals individually corresponding to the first signal and the second signal are stored in advance; and
a controlling section for reading a sequence of instantaneous values during respective periods where the first signal and the second signal are to be generated, to generate the first signal and the second signal, the sequence being stored in the storage areas of said storage section corresponding to the periods.

11. The receiving/transmitting apparatus according to claim 1, wherein
said signal generating section generates the first signal and the second signal in conformity with direct frequency synthesis which does not include a frequency-mixing process.

12. The receiving/transmitting apparatus according to claim 2, wherein
said signal generating section generates the first signal and the second signal in conformity with direct frequency synthesis which does not include a frequency-mixing process.

13. The receiving/transmitting apparatus according to claim 1, wherein
said signal generating section generates the first signal and the second in conformity with direct frequency synthesis which includes a frequency-mixing process and in which a leak in a local-frequency signal used in the frequency-mixing is suppressed so that said receiving section can separate the components of the reception wave at a desirable precision.

14. The receiving/transmitting apparatus according to claim 2, wherein
said signal generating section generates the first signal and the second in conformity with direct frequency synthesis which includes a frequency-mixing process and in which a leak in a local-frequency signal used in the frequency-mixing is suppressed so that said receiving section can separate the components of the reception wave at a desirable precision.

15. The receiving/transmitting apparatus according to claim 1, wherein
said signal generating section generates the first signal and the second signal in conformity with indirect frequency synthesis or frequency synthesis including a process of the indirect frequency synthesis, the indirect frequency synthesis having responsiveness such that the phase of the second signal is fixed with a desirable precision at the starting point of a period during which a reception wave to be separated by said receiving section at its every phase relative to the first signal or the second signal, arrives.

16. The receiving/transmitting apparatus according to claim 2, wherein
said signal generating section generates the first signal and the second signal in conformity with indirect frequency synthesis or frequency synthesis including a process of the indirect frequency synthesis, the indirect frequency synthesis having responsiveness such that the phase of the second signal is fixed with a desirable precision at the starting point of a period during which a reception wave to be separated by said receiving section at its every phase relative to the first signal or the second signal, arrives.

17. The receiving/transmitting apparatus according to claim 1, further comprising
an integrating section for integrating in parallel the components of each reception wave which is separated by said receiving section at its every phase relative to the first signal or the second signal.

18. The receiving/transmitting apparatus according to claim 2, further comprising
an integrating section for integrating in parallel the components of each reception wave which is separated by said receiving section at its every phase relative to the first signal or the second signal.

19. A radar equipment comprising:
a receiving/transmitting apparatus comprising
a signal generating section for alternately generating a first signal and a second signal having different frequencies from each other and their phases at fixed initial values, a transmitting section for radiating an emission wave generated based on the generated first signal, and a receiving section for heterodyne-detecting a reception wave received as a response to the radiated emission wave to discriminate the phase of the reception wave by using the generated second signal; and a signal processing section for performing signal processing associated with measurement of all or a part of the characteristic of a medium interposed between the radar equipment and its target, a relative distance and a relative position to the target, and a relative speed and the size of the target by using the phase discriminated by said receiving/transmitting apparatus.

20. The radar equipment according to claim 19, wherein said signal processing section identifies the target based on the measurement result obtained according to the signal processing.

21. A radar equipment comprising:

a receiving/transmitting apparatus comprising a signal generating section for alternately generating a first signal and a second signal having different frequencies from each other and their phases at fixed initial values, a transmitting section for radiating an emission wave generated based on the generated first signal, and a receiving section for receiving as a reception wave a reflective wave occurring in a medium through which the emission wave propagates, or a signal radiated by the medium in response to the emission wave, by heterodyne-detecting, with the use of the generated second signal, a reception wave received as a response to the radiated emission wave to discriminate the phase of the reception wave; and a signal processing section for performing signal processing associated with measurement of all or a part of the characteristic, shape, size and material of the medium based on the components of the reception wave which is separated by said receiving/transmitting apparatus at its every phase relative to the emission wave.

22. A radar equipment comprising:

a receiving/transmitting apparatus comprising a signal generating section for alternately generating a first signal and a second signal having different frequencies from each other and their phases at fixed initial values, a transmitting section for radiating the generated first signal as an emission wave, and a receiving section for receiving as a reception wave a reflective wave occurring in a medium through which the emission wave propagates, or a signal radiated by the medium in response to the emission wave, by heterodyne-detecting, with the use of the generated second signal, a reception wave received as a response to the radiated emission wave to discriminate the phase of the reception wave; and a signal processing section for performing signal processing associated with measurement of all or a part of the characteristic, shape, size and material of the medium based on the components of the reception wave which is separated by said receiving/transmitting apparatus at its every phase relative to the emission wave.

* * * * *